United States Patent [19]

Durham

[11] 4,373,760
[45] Feb. 15, 1983

[54] DRAWBOLT BEARING SUPPORT FOR BICYCLE PEDALS

[76] Inventor: Roger O. Durham, 1370 Thompson St., Glendale, Calif. 91201

[21] Appl. No.: 240,415

[22] Filed: Mar. 4, 1981

[51] Int. Cl.³ .............................................. F16C 9/02
[52] U.S. Cl. ............................... 308/179.5; 308/236; F16C/9/02
[58] Field of Search ............ 308/179.5, 189 R, 207 R, 308/179, 178, 192, 236

[56] References Cited

U.S. PATENT DOCUMENTS

| 627,946 | 6/1899 | Wilcox | 308/179.5 |
| 3,919,898 | 11/1975 | Sugino | 308/192 |
| 4,299,318 | 11/1981 | Segawa | 308/192 |

FOREIGN PATENT DOCUMENTS 2450392 9/1980 France .............................. 308/179.5

Primary Examiner—Lenard A. Footland

[57] ABSTRACT

An outboard ball bearing support for a bicycle pedal having a pedal spindle with an open, tubular outboard end. A shoulder bushing inserts into the open end of the pedal spindle. A drawbolt member having a head portion slips through the ball bearing's inner race, passes through the shoulder bushing, and engages internal threads in the pedal spindle near its inboard end. The drawbolt secures the bearing inner race and the shoulder bushing to the open end of the pedal spindle.

2 Claims, 2 Drawing Figures

DRAWBOLT BEARING SUPPORT FOR BICYCLE PEDALS

BACKGROUND OF THE INVENTION

This invention pertains to bicycle pedals, to the types of bearings used in bicycle pedals, and to the ways in which they are mounted on the pedal spindles.

Currently, most bicycle pedals use cup-and-cone bearings in which ball bearings are supported on cones on the spindle and in bearing cups in the pedal bodies. The outboard cone is usually adjustable. The spindles are usually solid members, made as lightly as possible, consistent with the need for strength and rigidity.

A bicycle pedal spindle is essentially a cantilever beam, having a circular cross section, which is loaded near its end. Since most of the load is carried on or near the outside surface of such members, it follows that pedal spindles should ideally be tubular or hollow, for maximum strength and rigidity with minimum weight. While some pedals have appeared which had spindles with axial holes drilled through them to lighten them without significantly reducing their strength or rigidity, very few have been produced with hollow, tubular spindles with thin walls.

Also, while a few pedals have appeared using modern bearings, it is true that few current bicycle pedals employ newer, improved bearings. One such bearing is the drawn-cup needle roller bearing.

In such bearings, steel rollers are retained by tubular cups which are rolled over at their ends, and the rollers are spaced apart and kept parallel to each other by light steel bearing cages. Such bearings are available with neoprene seals.

Because of their high radial capacity, light weight, guiding cages, neoprene seals, low cost, and ease of installation, drawn cup needle roller bearings are ideal inboard bearings for bicycle pedals, and they are particularly suitable for use with hollow tubular pedal spindles, because they can roll directly on such pedal spindles, without having inner races.

Another bearing which has never seen much use in bicycle pedals is the Conrad-type ball bearing having inseparable races.

Such ball bearings have relatively deep grooves and high carrying capacities in both radial and axial directions; they are ideal outboard bearings for bicycle pedals.

If the two bearings can be fitted into a straight bore through a pedal body, the pedal body is less expensive to make. However, if this is done, the inside diameter of the ball bearing is much smaller than the inside diameter of the drawn-cup needle roller bearing it is to be paired with; one of the problems addressed by the current invention is how to economically mount a Conrad bearing having a relatively small inside diameter onto the large open end of a tubular pedal spindle.

Also, since a tubular spindle would be heat treated to provide the required case and core hardnesses, and any subsequent heating might adversely affect such hardening, an outboard bearing mounting which required no further heating of the spindle, such as would occur if the spindle were annealed, welded, or brazed, would be of advantage. This is another problem addressed by the current invention.

SUMMARY OF THE INVENTION

According to the invention, a shoulder bushing inserts into an outward-facing central bore of an internally-threaded cylindrical pedal spindle. A threaded drawbolt member inserts through an outboard Conrad-type ball bearing, passes through the shoulder bushing, and engages internal threads at the inboard end of the pedal spindle. When tightened, the drawbolt supports the ball bearing and clamps it securely to the shoulder bushing, which in turn is clamped to the outboard end of the pedal spindle.

DETAILED DESCRIPTION OF THE DRAWINGS

Figure 1:
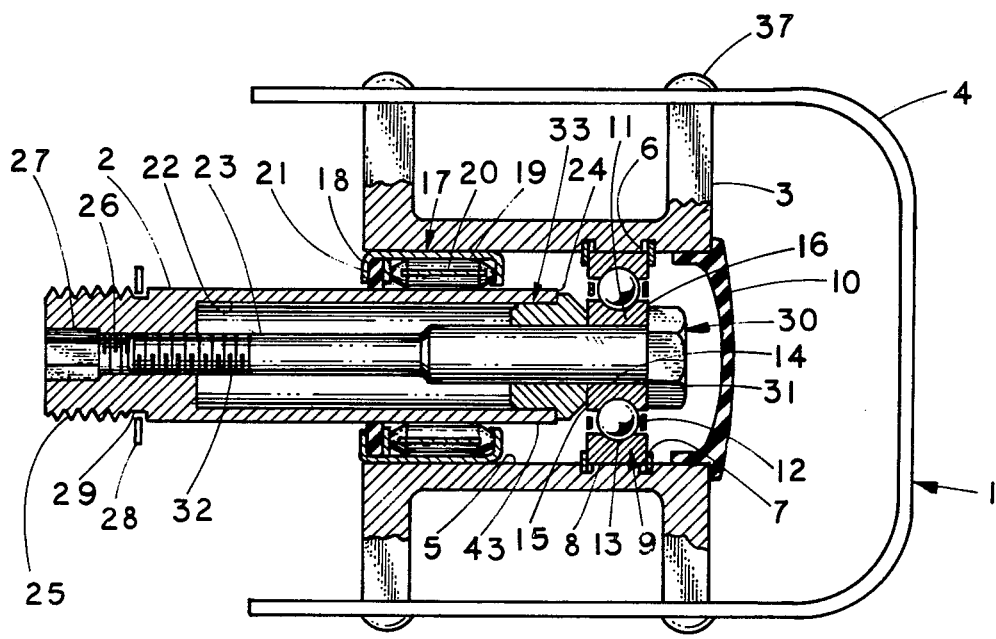
FIG. 1 shows a partial section through a bicycle pedal embodying a drawbolt-type outboard bearing support according to the invention.

Referring to FIG. 1, a bicycle pedal means 1 has a spindle 2, a pedal body 3, and a pedal cage 4, which is secured to said pedal body 3 by a number of fasteners 37.

The pedal body 3 has a central bore 5 and a pair of snap ring grooves 6 adapted for receiving a pair of internal snap rings 7, which axially retain an outer race 8 of an outboard ball bearing means 9. An end cap 10 inserts into the end of said central bore 5, closing it off from the entrance of dirt or water.

Said ball bearing means 9 has an inner race 11, and a pair of bearing cages 12 which retain a complement of balls 13. The inner race 11 has a central aperture 14, an inboard end 15, and an outboard end 16.

A drawn-cup needle roller bearing means 17 has a drawn steel cup 18 which presses into said central bore 5. A complement of rollers 19 are spaced apart and kept parallel to each other by a cage 20. A neoprene seal 21 contacts the outside surface of said spindle 2, preventing the entry of foreign matter into the area of the bearings.

Said pedal spindle 2 has an outward-facing central bore 22, a cylindrical outboard end 43, and an outboard face 24. The pedal spindle 2 has external threads 25 adapted for engaging corresponding internal threads of a bicycle crank arm which isn't shown. A snap ring 28 may be inserted into a thread relief 29 of the spindle 2 to serve as a shoulder.

The inboard end of said pedal spindle 2 has a hexagonal aperture 27 by which means the spindle 2 can be tightened in the bicycle's crank arm, using a suitable Allen wrench. Adjacent the hexagonal aperture 27, said pedal spindle 2 has internal threads 26.

Figure 2:
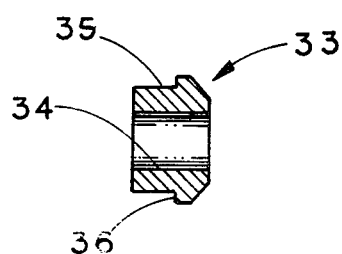
FIG. 2 shows a section through a shoulder bushing.

A shoulder bushing 33 is shown in FIG. 2 to have a central aperture 34, a cylindrical body 35, and a shoulder 36.

Referring again to FIG. 1, it will be seen that the cylindrical body 35 inserts into the central bore 22 of the pedal spindle 2. Shoulder 36 of said shoulder bushing 33 contacts the outboard face 24 of said pedal spindle 2.

A drawbolt means 30 has a head portion 31, a threaded inboard end 32, and a cylindrical body portion 32.

The cylindrical body portion 32 of the drawbolt means 30 inserts through the central aperture 14 of said ball bearing means 9, passes through the central aperture 34 of the shoulder bushing 33, and the threaded inboard end 32 engages the internal threads 26 of the pedal spindle 2.

As the drawbolt means 30 is tightened, the shoulder bushing 33 is drawn up to the pedal spindle 2, and the inner race 11 of said ball bearing means 9 is drawn up to the shoulder bushing 33, thus securely locating said ball bearing means 9 in relation to the pedal spindle 2.

I claim:

1. A drawbolt-type outboard bearing support for bicycle pedals comprising;
    (a) an internally-threaded pedal spindle with an outward-facing central bore, a cylindrical outboard end, and an outboard face;
    (b) a shoulder bushing having a central aperture, a cylindrical body adapted for closely engaging the outward-facing central bore of said pedal spindle, and a shoulder adapted for abutting the outboard face of said pedal spindle;
    (c) a ball bearing means having an inner race with a central aperture and inboard and outboard ends;
    (d) a drawbolt member having a threaded inboard end adapted for engaging the internal threads of the pedal spindle, a cylindrical body portion adapted for closely engaging the central aperture of said shoulder bushing, and adapted for engaging the central aperture of said ball bearing inner race, and a head portion adapted for bearing against the outboard end of said ball bearing inner race;
whereby the tightening of said drawbolt member secures the inner race of the ball bearing to the shoulder bushing and also secures the shoulder bushing to the outboard face of the pedal spindle.

2. In a bicycle pedal having a pedal body mounting an inboard needle bearing means and an outboard ball bearing means, said ball bearing means having an inner race with a central aperture,
    (a) a pedal spindle having an internally-threaded inboard end, a cylindrical outboard end, an outward-facing central bore, and an outboard face, and an outer cylindrical surface adapted for engaging said needle bearing means;
    (b) a shoulder bushing having a central aperture, a cylindrical body portion adapted for engaging said outward-facing central bore of said pedal spindle, and a shoulder adapted for abutting said outboard face of said pedal spindle;
    (c) a drawbolt means having a head portion, a cylindrical body portion adjacent said head portion, said cylindrical body portion adapted for engaging the central aperture of the inner race of said ball bearing means, said cylindrical body portion also adapted for engaging the central aperture of said shoulder bushing, said drawbolt means also having a threaded inboard end adapted for engaging said internal threads of said pedal spindle, whereby the inner race of said ball bearing means is secured to said shoulder bushing means, and said shoulder bushing means is secured to the outboard face of said pedal spindle.

* * * * *